(12) United States Patent
Stroup

(10) Patent No.: US 6,807,855 B2
(45) Date of Patent: Oct. 26, 2004

(54) METHODS FOR TESTING FLUID COMPRESSORS

(76) Inventor: Scott Stroup, 1206 Josephine St., Denver, CO (US) 80206

( * ) Notice: Subject to any disclaimer, the term of this patent is extended or adjusted under 35 U.S.C. 154(b) by 0 days.

(21) Appl. No.: 10/328,867

(22) Filed: Dec. 24, 2002

(65) Prior Publication Data
US 2003/0121557 A1 Jul. 3, 2003

Related U.S. Application Data

(62) Division of application No. 09/668,519, filed on Sep. 22, 2000, now Pat. No. 6,502,602.

(51) Int. Cl.$^7$ .............................................. G01M 19/00
(52) U.S. Cl. ....................................................... 73/168
(58) Field of Search ........................ 73/168, 1.36, 1.25, 73/1.26

(56) References Cited

U.S. PATENT DOCUMENTS

| | | | | | |
|---|---|---|---|---|---|
| 3,002,380 | A | * | 10/1961 | Grove | 73/168 |
| 4,432,230 | A | * | 2/1984 | Stahler et al. | 73/168 |
| 6,450,023 | B1 | * | 9/2002 | Addie et al. | 73/168 |

* cited by examiner

Primary Examiner—Robert Raevis
(74) Attorney, Agent, or Firm—Armstrong Teasdale LLP

(57) ABSTRACT

A flow meter including at least one flow valve used to performance test system compressors is described. The flow meter includes a pressure vessel including at least one exit port. A flow valve is coupled to each vessel exit port, and each flow valve discharges fluid from the vessel at a predetermined flow rate. The flow valve includes a first end, a second end, and a bore extending therethrough. The bore includes an entrance portion and an exit portion. The bore entrance portion is frusto-conical and curves outwardly from the bore exit portion such that a diameter of the bore entrance portion is variable and larger than a diameter of the bore exit portion.

4 Claims, 3 Drawing Sheets

METHODS FOR TESTING FLUID COMPRESSORS

This application is a divisional of U.S. application Ser. No. 09/668,519, filed Sep. 22, 2000, now U.S. Pat. No. 6,502,602, which is hereby incorporated by reference.

BACKGROUND OF THE INVENTION

This invention relates generally to fluid compressors and, more particularly, to methods and apparatus for testing fluid compressors.

Plant compressed fluid systems typically include at least one compressor that supplies compressed fluid through piping to a plurality of components. Overtime, couplings used to join components, the compressor, and piping within the plant fluid system may loosen and allow compressed fluid to escape to the atmosphere. Such leaks may decrease the operating efficiency of the compressor and the plant air system, and increase the operating costs associated with the plant fluid system.

To reduce the effects of plant compressed fluid system leaks, various testing components including ultrasonic testing devices, in-line flow metering devices, and pressure profiling systems, are used to diagnose the compressed fluid system. However, known compressed fluid testing equipment does not quantify fluid leaks, determine compressor and system performance, or provide data that can be used to diagnose and adjust compressor controls under load.

Because known diagnostic equipment does not quantify compressed fluid leaks, compressor performance and controls are often ignored or inadequately addressed in a compressed fluid system analysis. Instead, often compressor tests are focused on power consumption and no actual fluid flow measurements under known load conditions are acquired. As a result, compressor controls for inlet throttling and blowoff are often set inappropriately which increases operating costs, lowers operating efficiency, and may lead to eventual failure of the compressor.

BRIEF SUMMARY OF THE INVENTION

In an exemplary embodiment, a flow meter including at least one flow valve is used to performance test system compressors. The flow meter includes a pressure vessel including at least one exit port. A flow valve is coupled to each vessel exit port and each flow valve discharges fluid from the vessel at a pre-determined flow rate. The flow valve includes a unitary body including a first end, a second end, and bore extending therethrough. The bore includes an entrance portion extending from the flow valve first end, and an exit portion extending between the entrance portion and the flow valve second end. The bore exit portion is substantially cylindrical and has a substantially constant diameter therethrough. The bore entrance portion is frusto-conical and curves outwardly from the bore exit portion such that a diameter of the bore entrance portion is variable longitudinally through the bore entrance portion, and is larger than a diameter of the bore exit portion.

During testing, the flow meter is coupled to a plant fluid system to receive a full discharge of fluid exiting the compressor. The flow meter is selectively opened to discharge fluid from the flow meter pressure vessel through at least one flow valve. Each flow valve discharges fluid at a pre-determined flow rate, and as subsequent flow valves are opened, a total flow rate through the flow valves is created. The desired total flow rate represents a free fluid delivery for the compressor at a specific test pressure for the compressor. By testing the compressor at various test pressures, compressor output over a span of loads is obtained and a performance curve for the compressor is generated. Additional testing with the flow meter determines system leak volume and consumption. Because performance curves are generated in a reliable and cost-effective manner, lower system operating costs are facilitated.

DETAILED DESCRIPTION OF THE INVENTION

Figure 2:
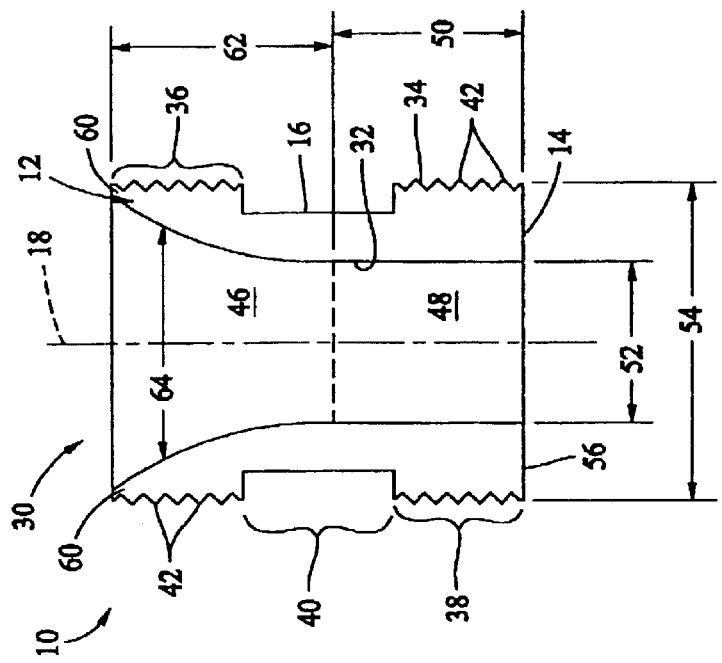
FIG. 2 is a cross-sectional view of the flow valve shown in FIG. 1.
Figure 1:
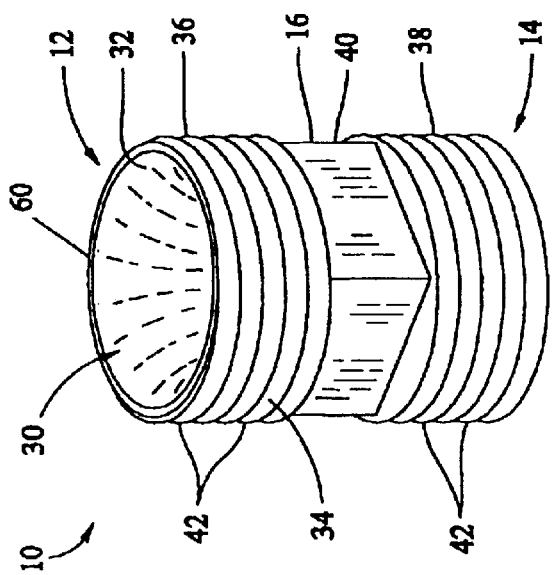
FIG. 1 is a perspective view of a flow valve.

FIG. 1 is a perspective view of a flow valve 10, and FIG. 2 is a cross-sectional view of flow valve 10. Valve 10 includes an entrance end 12, an exit end 14, and a unitary body 16 extending therebetween. Valve 10 also includes a center axis of symmetry 18 extending from valve entrance end 12 to valve exit end 14. In one embodiment, valve 10 is machined from stainless steel. Flow valve 10 is sized and selected such that fluid supplied to flow valve 10 over a range of pressures is discharged at a pre-determined flow rate. In one embodiment, air is the fluid supplied to flow valve 10. Because flow valve 10 is machined, flow valve 10 operates reliably between tests without requiring additional calibration adjustments between subsequent tests. In one embodiment, fluid is supplied to flow valve 10 at a pressure between approximately 10 and 150 psig.

Body 16 is substantially cylindrical and includes a bore 30, an inner surface 32, and an outer surface 34. Body 16 includes a first portion 36, a second portion 38, and a center portion 40 extending therebetween. In the exemplary embodiment, body first portion 36 is identical with body second portion 38 and each portion 36 and 38 has a substantially circular cross-sectional profile defined by body outer surface 34. In an alternative embodiment, body first portion 36 is not identical with body second portion 38.

Body first and second portions 36 and 38, respectively, include a plurality of threads 42 extending longitudinally from respective valve entrance and exit ends 12 and 14 to body center portion 40. Threads 42 are used to couple flow valve 10 between a flow meter (not shown in FIGS. 1 and 2) and a muffler (not shown in FIGS. 1 and 2). More specifically, threads 42 couple flow valve 10 to the flow meter such that fluid flow enters flow valve 10 into valve entrance end 12 and exits flow valve 10 from valve exit end 14. In an alternative embodiment, only body first portion 36 includes threads 42.

Body center portion 40 extends between body first and second portions 36 and 38, respectively. In one embodiment, body center portion 40 is a wrench flat, and has a substantially square cross-sectional profile defined by body outer surface 34. Body center portion 40 permits a wrench (not shown) to engauge flow valve 10, such that flow valve 10 may be tightly coupled to either the muffler or the flow meter without the wrench contacting threads 40.

Bore 30 is defined by body inner surface 32, and extends through body 16 between valve entrance end 12 and valve exit end 14. Bore 30 includes an entrance portion 46 and an exit portion 48. Entrance portion 46 extends between valve entrance end 12 and bore exit portion 48, and exit portion 48 extends from bore entrance portion 46 to valve exit end 14. Bore exit portion 48 is substantially cylindrical and has a length 50 and a diameter 52.

Bore exit portion diameter 52 is less than a diameter 54 of body 16 defined by body outer surface 34. Accordingly, at valve exit end 14, an annular shoulder 56 is defined between bore exit portion 48 and body outer surface 34. Bore exit portion diameter 52 is substantially constant through bore exit portion 48 along bore exit portion length 50. Bore exit portion length 50 is approximately equal bore exit portion diameter 52. Because bore exit portion 48 does not contact body outer surface 34 at valve exit end 14, an annular lip 60 is defined between bore entrance portion 46 and body outer surface 34. In one embodiment, bore exit portion 48 flares divergently adjacent valve exit end 14. In another embodiment, annular lip 60 is not defined and bore exit portion 48 and body outer surface 34 contact and define an edge (not shown).

Bore entrance portion 46 is frusto-conical and extends between valve entrance end 12 and bore exit portion 48. In one embodiment, valve inner surface 32 curves in a parabolic curve within bore entrance portion 46. More specifically, within bore entrance portion 46, valve inner surface 32 curves outwardly from bore exit portion 48 and converges towards body outer surface 34 at valve entrance end 12. Bore entrance portion 46 has a length 62 measured between bore exit portion 48 and valve entrance end 12, and a diameter 64 measured with respect to bore entrance portion valve inner surface 32. Because bore entrance portion 46 is frusto-conical, bore entrance portion diameter 64 is variable longitudinally, and bore entrance portion diameter 64 is thus larger than bore exit portion diameter 52. Furthermore, because bore exit portion 48 does not contact body outer surface 34, bore entrance portion diameter 64 is smaller than flow valve body diameter 54. In one embodiment, flow valve 10 is selected to discharge fluid at a flow rate of approximately 400 cfm, bore exit portion diameter 52 is approximately 0.5 inches, and at valve entrance end 12, bore entrance portion diameter 64 is approximately 2.125 inches.

In use, flow valve 10 is selected such that fluid supplied to flow valve 10 over a range of pressures is discharged from flow valve 10 with a pre-determined flow rate. Compressed fluid is directed through flow valve 10 and enters valve body bore 30 from valve entrance end 12. Because bore entrance portion 46 is convergent, the fluid is accelerated and channeled into bore exit portion 48. The combination of bore entrance portion length 62 and diameter 64, and bore exit portion length 50 and diameter 52, determines the flow rate of the fluid discharged from flow valve 10.

Figure 3:
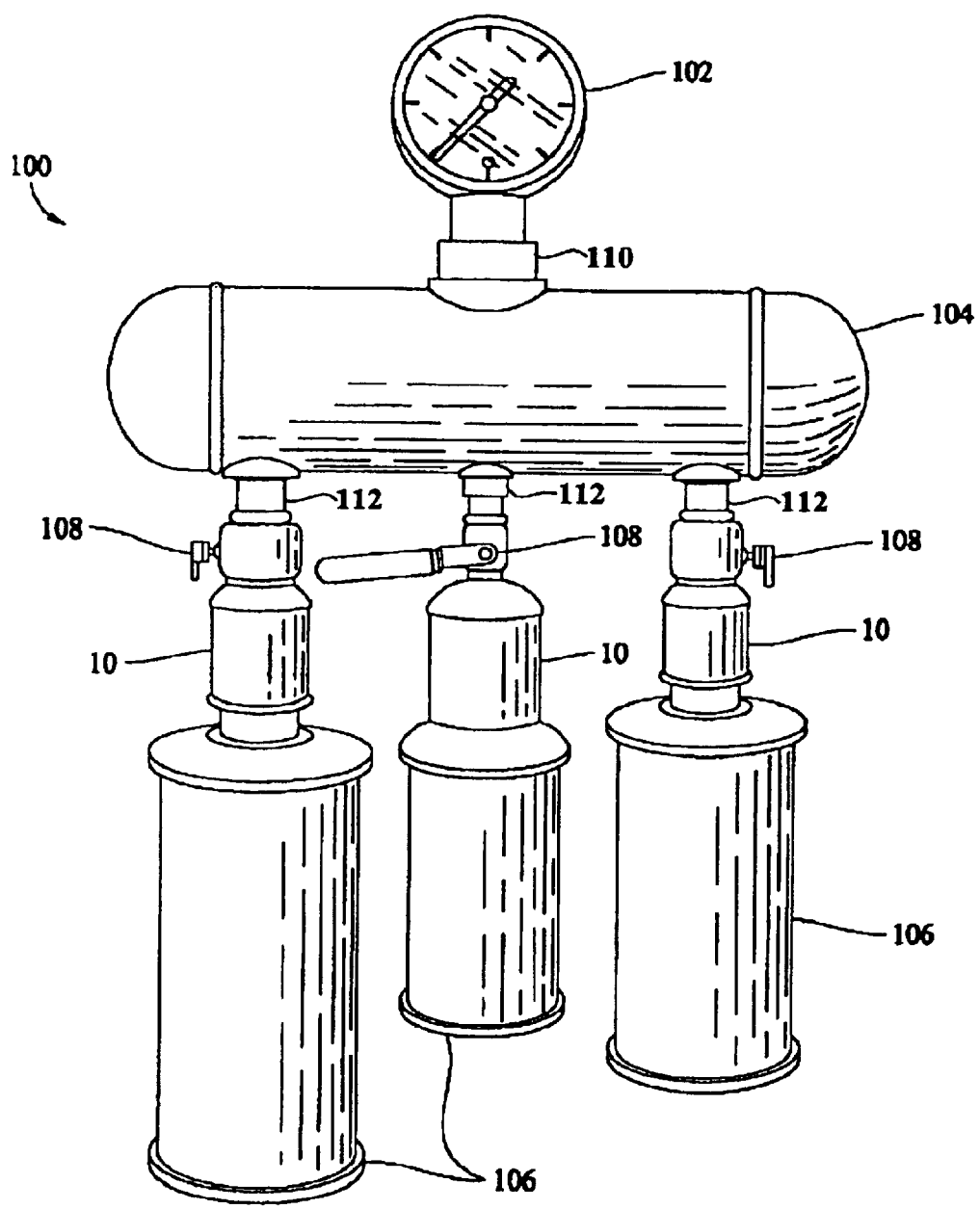
FIG. 3 is a side perspective view of a flow meter including the flow valve shown in FIG. 1.

FIG. 3 is a side perspective view of a flow meter 100 including at least one flow valve 10 to discharge fluid at a pre-determined flow rate. Flow meter 100 also includes a pressure gauge 102, a pressure vessel 104, a plurality of mufflers 106, and a plurality of valve controls 108. In the exemplary embodiment, flow meter 100 is an air flow meter and includes four mufflers 106, eight valve controls 108, and eight flow valves 10 that discharge fluid at various pre-determined flow rates.

Pressure vessel 104 includes an entrance port 110 and at least one exit port 112. In the exemplary embodiment, pressure vessel 104 includes three exit ports 112. Pressure vessel 104 is rated to operate within a range of operating pressures and is selected based on an operating pressure of a plant fluid system (not shown in FIG. 3) to be tested and as such, includes a variable amount of exit ports 112. In one embodiment, pressure vessel 104 is available from Airometrix Manufacturing, Inc., Denver, Colo.

Pressure gauge 102 is known in the art and is coupled to pressure vessel 104 to display the pressure of fluid entering flow meter 100. Accordingly, pressure gauge 102 is selected based on the operating pressure of the plant fluid system to be tested. In one embodiment, pressure gauge 102 is available from Noshok, Inc., Middleburg Heights, Ohio.

Valve controls 108 are known in the art and each is coupled to a pressure vessel exit port 112 such that fluid exiting pressure vessel 104 through vessel exit ports 112 flows through valve controls 108. Valve controls 108 are selectively operable to control an amount of fluidflow exiting pressure vessel 104. Accordingly, valve controls 108 are selected based on the operating pressure of the plant fluid system to be tested. In one embodiment, valve controls 108 are available from Conbraco Industries, Inc., Matthews, N.C.

Flow valves 10 are coupled to valve controls 108 downstream from flow meter pressure vessel 104. More specifically, flow valves 10 are coupled to valve controls 108 such that each flow valve entrance end 12 is adjacent valve control 108, and thus, receives fluid exiting each valve control 108. Accordingly, fluid exiting valve controls 108 is channeled into flow valve bore entrance portion 46.

Mufflers 106 are known in the art and each is coupled to flow valves 10 downstream from valve controls 108. More specifically, mufflers 106 are coupled to each flow valve exit end 14 to reduce an amount of noise generated as a result of fluidflow exiting each flow valve 10. In an alternative embodiment, flow meter 100 does not include mufflers 106 and fluid exiting flow valves 10 is discharged to the atmosphere without passing through mufflers 106. In one embodiment, valve controls 108 are available from Allied Witan Co., Cleveland, Ohio.

In use, flow meter 100 is coupled downstream from a compressor (not shown in FIG. 3) after the compressor is isolated from the plant fluid system. More specifically, flow meter 100 is plumbed such that a full flow of compressed fluid exiting the compressor flows through flow meter 100. Accordingly, flow meter 100 is selected based on the operating pressure range of the compressor to be tested. More specifically, the total flow limit of flow valves 10 coupled to flow meter 100 determines the applicability of a specific flow meter 100.

A pre-determined test pressure is selected for the compressor that is within the flow meter total flow limit and the compressor is operated at the pre-determined test pressure. Flow meter pressure gauge 102 ensures that flow meter 100 receives compressed fluid from the compressor at the pre-determined test pressure. Valve controls 108 are then selectively opened to permit fluid to discharge from flow meter 100 through a downstream flow valve 10. Flow valves 10 coupled to flow meter 100 are selectively sized based on the operating pressure of the compressor, and each flow meter discharges fluid at a pre-determined flow rate. Subsequent valve controls 108 are then sequentially opened to permit additional fluid to exit flow meter 100, until pressure gauge 102 indicates that the pressure of fluid entering flow meter 100 is decreasing from the selected test pressure.

When the compressor test pressure decreases, a total flow rate of fluid exiting the compressor is known because each flow valve 10 discharges fluid at a pre-determined flow rate.

The total flow rate is known as a free fluid delivered (FAD) rate and is specific for the compressor at the specific test pressure. By testing the compressor at various test pressures, compressor output over a span of loads is obtained and a performance curve for the compressor is generated. The additional tests are performed by opening and closing more or less flow valves and noting changes in pressure in conjunction with the total flow rate of fluid exiting the compressor.

Figure 4:
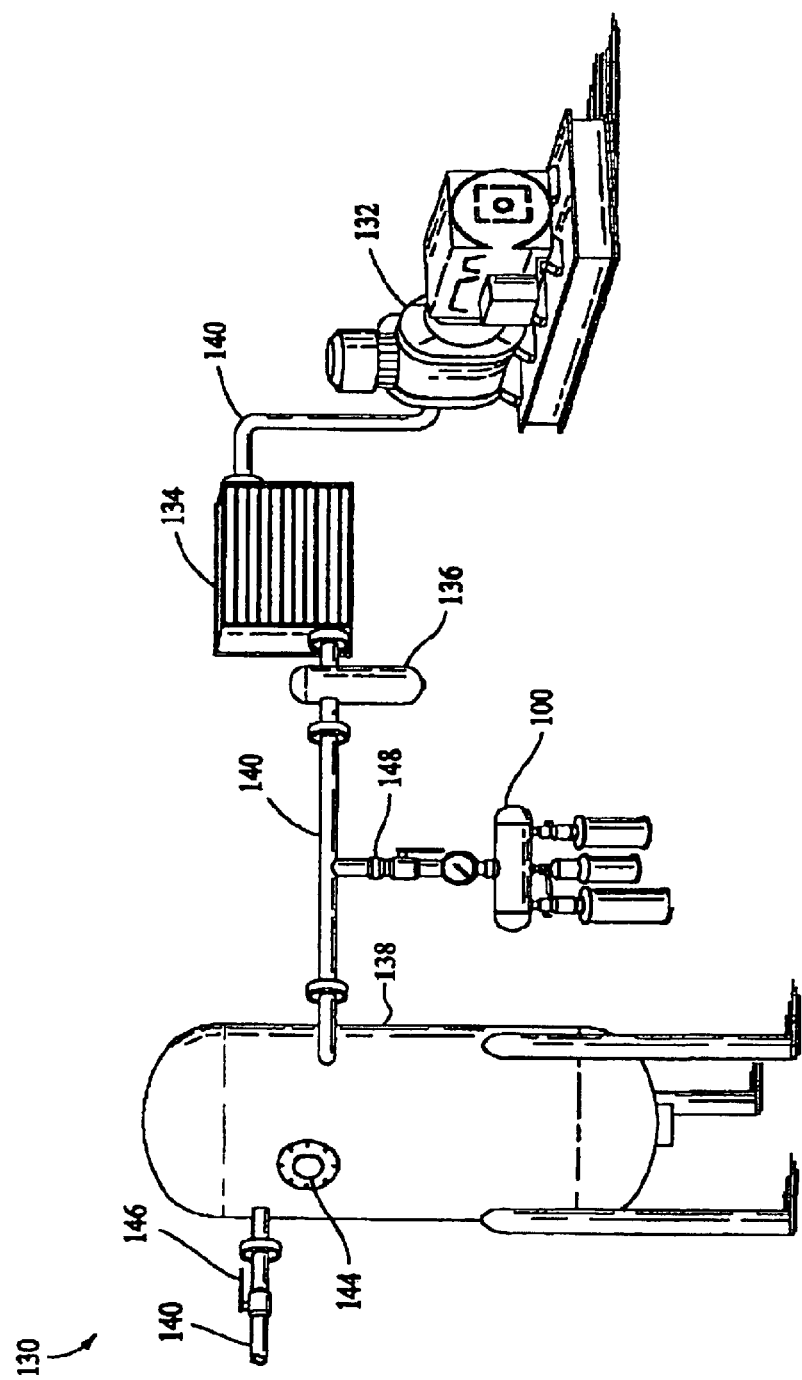
FIG. 4 is a perspective view of a plant fluid system configured to be tested using the flow meter shown in FIG. 3.

FIG. 4 is a perspective view of a plant fluid system 130 configured to be tested using flow meter 100. In the exemplary embodiment, plant fluid system 130 is an air system and includes a fluid compressor 132, an aftercooler 134, a moisture separator 136, a receiver tank 138, and a plurality of piping 140. Fluid compressor 132 is known in the art and supplies compressed fluid to plant fluid system 130. In one embodiment, plant fluid system 130 includes a plurality of compressors 132 that can be individually isolated from plant fluid system 130.

Piping 140 serially connects compressor 132 to aftercooler 134 and moisture separator 136. Aftercooler 134 and moisture separator 136 are known in the art and operate in combination to reduce a temperature of fluid exiting compressor 132 and to reduce an amount of condensation and moisture carry-over from fluid exiting compressor 132.

Additional piping 140 couples receiver tank 138 between compressor 132 and various components (not shown) that utilize compressed fluid downstream from receiver tank 138. In one embodiment, piping 140 also couples an air dryer to system 130. Receiver tank 138 is known in the art and stores compressed fluid exiting compressor 132 to facilitate reducing demand surges on compressor 132 from components that use compressed fluid. In one embodiment, receiver tank 138 includes an additional tap orifice 144, known as a bung.

Flow meter 100 is coupled downstream from compressor 132 to plant fluid system 130, after compressor 132 is isolated from plant fluid system 130. In one embodiment, plant fluid system 130 includes an isolation valve 146 downstream from receiver tank 138 that is selectively operable to isolate compressor 132 from plant fluid system 130. More specifically, flow meter 100 is coupled to plant fluid system 130, such that a full flow of compressed fluid exiting compressor 132 flows through flow meter 100. In the exemplary embodiment, flow meter 100 is coupled to plant fluid system 130 with piping extending to a service port 148 that is used to couple a portable compressor (not shown) to plant fluid system 130. In another embodiment, flow meter 100 is coupled to plant fluid system 130 at receiver tank tap orifice 144. In yet another embodiment, flow meter 100 is coupled to plant fluid system 130 at a drop leg or tap (not shown) in a compressor room (not shown). Alternatively, flow meter 100 is coupled to plant fluid system 130 at any location downstream from compressor 132 that can be isolated from system 130.

A pre-determined operating test pressure is selected for compressor 132 that is within the flow meter total flow limit, and compressor 132 is operated at the pre-determined test pressure. Flow meter pressure gauge 102 ensures that flow meter 100 receives compressed fluid from compressor 132 at the pre-determined test pressure. Valve controls 108 are then selectively opened to permit fluid to discharge from flow meter 100 through a downstream flow valve 10. Flow valves 10 coupled to flow meter 100 are sized based on the operating pressure of compressor 132, and each flow valve 10 discharges fluid at a pre-determined flow rate. Subsequent valve controls 108 are then opened and closed, and the changes in pressure with respect to total flow rate are recorded. When pressure gauge 102 indicates that the pressure of fluid entering flow meter 100 is decreasing from the selected test pressure, then the total flow rate is determined.

When the compressor test pressure decreases, the total flow rate of fluid exiting compressor 132 is known because each flow valve 10 discharges fluid at a pre-determined flow rate. By testing compressor 132 at various test pressures, compressor output over a span of loads is obtained and a performance curve for compressor 132 is generated. Additional tests are performed by opening and closing more or less flow valves 10 and noting changes in pressure in conjunction with the total flow rate of fluid exiting compressor 132. In one embodiment, simultaneous power readings of compressor 132 are recorded at each load point to permit compressor flow, pressure, and power performance to be recorded. In another embodiment, compressor output data is used to adjust compressor control settings, including compressor inlet throttling and compressor blowoff settings.

Performance data obtained from the above-described testing is used to diagnose compressor performance and generate compressor performance curves. In one embodiment, such performance data is used to determine predictive and preventive maintenance schedules for compressor 132. Compressor testing also determines system leak volume of the various components.

To perform system leak testing, system 130 is tested as described above without any additional components operating. A second test is then performed on compressor 132 at the previously tested system pressure, with isolation valve 146 opened and system 130 pressurized without any air consuming equipment operating. When system 130 is pressurized, a lower amount of fluid flows through flow meter 100. A difference between the two tests represents an amount of leak volume in system 130. For example, if an isolated compressor 132 is tested at 100 psig at 1000 cfm, and then retested at 100 psig with system 130 pressurized, and a flow of 600 cfm is obtained, then the difference of 400 cfm represents the leak volume for system 130.

Additional testing determines system compressed fluid consumption and individual component compressed fluid consumption. Testing is performed on system 130 before and after each specific component is operated. A difference in flow readings between the component "on" and "off" conditions represents the compressed fluid consumption of that specific component. In another embodiment, overall system consumption is obtained by testing each compressor 132 individually to determine flow rates of each system compressor 132 and subtracting the leak volume of system 130.

The above-described flow meter is cost-effective and reliable. The flow meter includes at least one flow valve machined to discharge fluid at a pre-determined flow rate. By using multiple flow valves of different sizes and known discharge flow rates, fluid flow from a compressor is quantified and compressor performance curves are generated. As a result of compressor testing, compressor fluid consumption of system equipment may be quantified and compressor controls may be diagnosed in a cost-effective and reliable manner.

While the invention has been described in terms of various specific embodiments, those skilled in the art will recognize that the invention can be practiced with modification within the spirit and scope of the claims.

What is claimed is:

1. A method for testing a fluid compressor using a flow meter, said method comprising the steps of:

isolating the fluid compressor from the system;

coupling a flow meter including a vessel to the system downstream from the fluid compressor;

coupling at least one flow valve to the flow meter with a plurality of threads for discharging fluidflow from the flow meter at a pre-determined flow rate, wherein the flow valve includes a first end, a second end, and a bore extending therebetween, the bore including a first portion and a second portion, the bore second portion having a first diameter and a first length, the bore first portion curving outwardly from said bore second portion such that a bore second diameter measured within said bore first portion is larger than the bore first diameter, and wherein the bore first length is approximately equal the bore first diameter;

selectively discharging fluid through the flow valve such that the fluid exits the flow valve to at least one of the atmosphere and a muffler; and measuring a system pressure as fluid is discharged through flow meter.

2. A method in accordance with claim 1 wherein said step of measuring a system pressure further comprises the step of determining free fluid delivered for the compressor.

3. A method in accordance with claim 1 wherein said step of measuring a system pressure further comprises the step of determining system leak volume.

4. A method in accordance with claim 1 wherein said step of measuring a system pressure further comprises the step of generating a compressor performance curve.

* * * * *